Nov. 17, 1936.    L. W. G. FLYNT    2,060,859
AEROFOIL WIRE
Original Filed Oct. 19, 1933    2 Sheets-Sheet 1
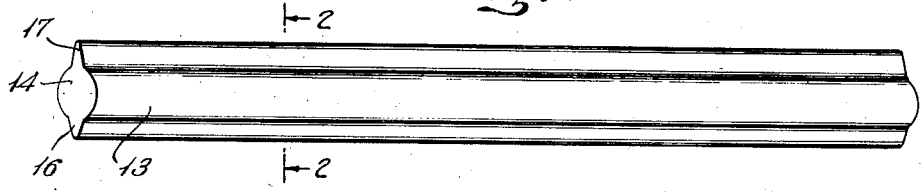
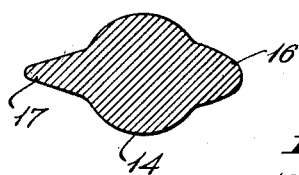
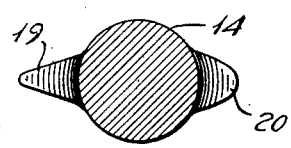
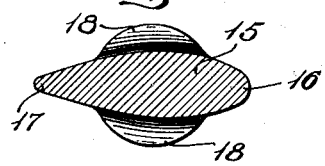
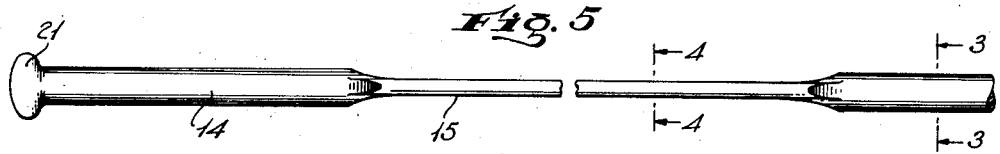
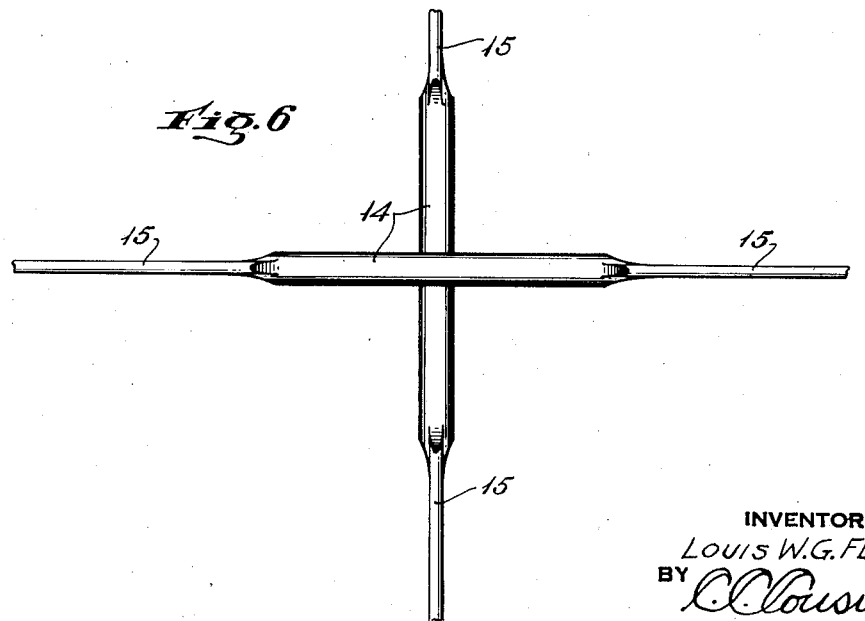
INVENTOR
LOUIS W.G. FLYNT
BY
ATTORNEY Nov. 17, 1936.   L. W. G. FLYNT   2,060,859
AEROFOIL WIRE
Original Filed Oct. 19, 1933   2 Sheets-Sheet 2
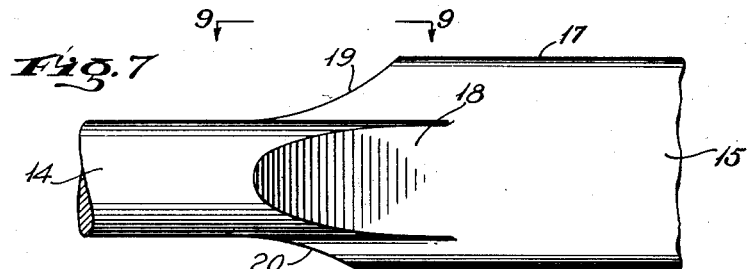
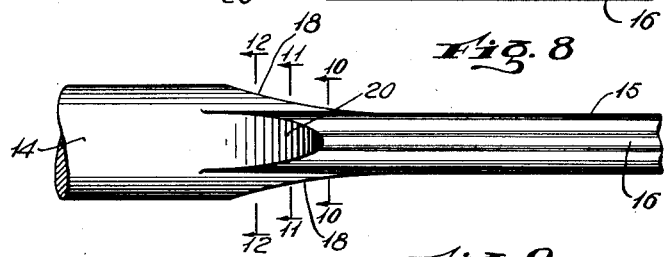
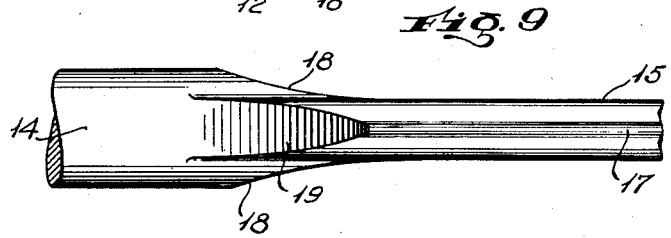
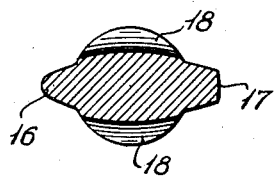
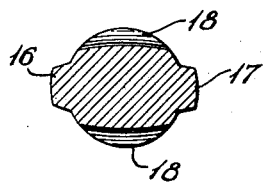
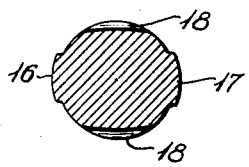
INVENTOR
LOUIS W. G. FLYNT
BY C. C. Cousins
ATTORNEY Patented Nov. 17, 1936

2,060,859

UNITED STATES PATENT OFFICE 2,060,859

AEROFOIL WIRE

Louis W. G. Flynt, East Orange, N. J., assignor to Breeze Corporations, Inc., Newark, N. J.

Original application October 19, 1933, Serial No. 694,276. Divided and this application July 12, 1934, Serial No. 734,809

13 Claims. (Cl. 244—31)

This invention relates to wire or rods of true aerofoil section and is a division of co-pending application Serial No. 694,276, filed October 19, 1933. By "true aerofoil" is meant a shape having a curved, relatively blunt forward edge and a relatively long trailing edge as distinguished from shapes known generically or loosely as "streamlined", which shapes may be oval, lenticular or other shapes including aerofoil.

The words "tie rods" as used herein denote generally all rods, wires, braces, struts, guy wires, etc., whether used under tension, compression or otherwise.

While the invention herein is described in connection with aerofoil rods, it may be embodied in a rod of any desired cross-section.

This invention is applicable to many arts where tie rods are used. It is particularly adapted for use under conditions where it is desired to decrease the air resistance of tie rods. For the purpose of this disclosure the invention is described in connection with its use on aircraft.

In aircraft practice, where tie rods are exposed to the air stream, a considerable resistance is set up. This resistance can be materially decreased and the efficiency of the aircraft considerably increased by making all exposed tie rods of true aerofoil section.

Therefore, the broad object of this invention is to provide an aerofoil wire or rod suitable for use as a tie rod. It has been found that it is impractical to use a wire or rod having an aerofoil form throughout its length. Therefore, a further object of this invention is to produce a wire or rod of a true aerofoil shape having terminal extensions of a different shape for engagement by or with suitable connecting means.

Due to the extreme vibration encountered in aircraft practice the metal will become fatigued and a breakdown may result if there is any point in the length of the tie rod at which the stresses set up by constant vibration may be localized or concentrated. Where there is any variation in the cross-sectional area between the ends of the rod, the stresses will be localized at the point of least cross-sectional or at the point where the area changes and a breakdown may result.

Therefore, a further object of the invention is to provide a rod or wire having a true aerofoil section for a part of its length and a different section for the remainder of its length, but which will have substantially the same cross-sectional area at all points in its length. Furthermore, if the rod or wire is not absolutely straight the stresses will be localized at the point at which the longitudinal axis varies from a straight line, even though such variation be very slight. Therefore, a further object of the invention is to provide an aerofoil wire or rod without any bends or curves.

Where two rods or braces cross one another it is not practical to have the rods of aerofoil section at the point of crossing, because of the relatively large width from edge to edge of the aerofoil rod. Therefore, a further specific object of the invention is to produce a wire having an aerofoil section, but which will be circular at the point at which it crosses another wire.

The invention consists of the construction, combination, and arrangement of parts, as herein illustrated, described and claimed.

In the accompanying drawings, forming part hereof, is illustrated a form of embodiment of the invention, in which drawings similar reference characters designate corresponding parts, and in which:

Figure 1 is a perspective view of a section of stock from which the rod is made;

Figure 2 is a section on line 2—2 of Figure 1, looking in the direction indicated by the arrows;

Figure 3 is a section on line 3—3 of Figure 5, looking in the direction indicated by the arrows;

Figure 4 is a section on line 4—4 of Figure 5, looking in the direction indicated by the arrows;

Figure 5 is a plan view, partly broken away, showing the aerofoil shape in the center of the rod and the cylindrical shape on the ends of the rod;

Figure 6 is a detail in plan of two rods crossing one another, the ends of the rods being broken away;

Figure 7 is an enlarged fragmentary detail in side elevation of that portion where the aerofoil merges with the cylindrical section, the trailing edge being on top;

Figure 8 is an enlarged fragmentary detail in bottom plan of the portion shown in Figure 7;

Figure 9 is an enlarged fragmentary detail in plan of the portion shown in Figure 7;

Figure 10 is a vertical section taken approximately on line 10—10 of Figure 8, looking in the direction indicated by the arrows;

Figure 11 is a vertical section taken approximately on line 11—11 of Figure 8, looking in the direction indicated by the arrows; and, Figure 12 is a vertical section taken approximately on line 12—12 of Figure 8, looking in the direction indicated by the arrows.

Referring to the drawings, 13 designates a bar of metal which may be rolled or drawn steel. As shown by Figures 2, 3 and 4, the cross-section of the bar 13 is such that it combines both a circular section 14 and an aerofoil section 15. The aerofoil section 15 comprises a portion within the limits of the circular section together with a leading edge 16 and a trailing edge portion 17, both extending beyond the circumference of the circular section 14.

In the manufacture of the wire, the bar 13 is first heat-treated under tension to straighten the same and to impart the desired physical characteristics to the metal, as more fully described in co-pending application, Serial No. 694,276, filed October 19, 1933. The aerofoil sections 16 and 17 adjacent the ends of the bar 13 are then removed by milling, leaving the ends of the bar 13 of cylindrical shape 14. Since the cutter on the milling machine is circular, a curved portion or run-off 19 will be formed between the cylinder 14 and the trailing edge 17 at the point at which the milling operation is stopped. On the opposite edge of the stock 13 a similar curved portion or run-off 20 will be left between the cylinder 14 and the leading edge 16.

When the cylindrical sections 14 have been formed the ends thereof may be upset to form heads 21 for use with a connecting means such as is disclosed in the copending application of James H. Steenson, Serial No. 624,321. The ends of the cylindrical portion 14 may also be threaded or otherwise formed for engagement with suitable connecting means.

When the ends of the rod have been formed the center portions thereof are milled to remove the cylindrical portions 14 in excess of the aerofoil section 15. This leaves the intermediate portion of the rod of a true aerofoil section, as shown in Figure 4.

Since a circular cutter is used, there will not be a sudden change from aerofoil to cylinder, but instead, a curved portion or run-off 18 will be left on each side of the rod. The milling operation on the center of the rod is carried far enough so that the curved portion 18 will end at or a little short of the beginning of the curves 19 and 20 on the cylinder 14.

The cross-section of the stock 13 is such that the cross-sectional area of the aerofoil section 15 is equal to the cross-sectional area of the cylinder 14. However, as shown by Figures 7 to 12, on those portions of the rod where the aerofoil section 15 merges with the cylinder 14, the cross-section is neither circular nor aerofoil but is a combination of a portion of each shape. As shown by the progressive sections in Figures 10 to 12, as more of the cylindrical portion 14 is left on the stock 13, more of the aerofoil sections 16 and 17 are removed.

It will be noted that while the curves 19 and 20 are similar to one another, the curve 18 is a different curve. This is accomplished by using different sizes of cutters on the milling machine. For example, a cutter having a one-inch radius may be used in removing the sections 16 and 17 to produce the curves 19 and 20 while a cutter having a three-inch radius will be used to remove the excess cylindrical portions to produce the curves 18. As a result, on that portion of the rod where the cylindrical merges with the aerofoil shape, the amount of metal in cross-sectional area removed from one shape is balanced by the additional amount of metal in cross-sectional area left on the other shape. Therefore, the cross-sectional area is substantially the same throughout that portion where the two shapes merge.

Since the cross-sectional area of the cylindrical portion 14 and the aerofoil portion 15 is the same, and since on the merging of the two shapes the cross-sectional area removed from one shape is balanced by the additional cross-sectional area left on the other shape, the cross-sectional area of the finished rod will be substantially the same at all points in its length.

Where the curved portion 18 meets the cylinder 14 a relatively abrupt edge is left. These edges also occur where the curve 19 meets the edge 17 and where the curve 20 meets the edge 16. These relatively abrupt edges may be rounded off by hand filing or by suitable machining.

Where two rods or wires cross one another it is not practical to have them of aerofoil formation at the point of crossing by reason of the greater width of the aerofoil form. This can be readily seen by a comparison of the distance between the edges 16 and 17 as shown in Figure 7 with the diameter of the cylinder in Figure 7. In Figure 6 is illustrated the provision made for two wires that cross one another. At and adjacent the point of crossing the full cylindrical portion 14 is left on the stock 13 and the aerofoil portions 16 and 17 are removed. In this way the two wires are permitted to lie closer together than would be possible if both were of aerofoil section.

The method of making such wires is the same as heretofore described, except that in addition to forming the ends of the wire into a circular section, a portion intermediate of the ends of the wire is also formed with a circular section, and the remainder of the wire is formed of the aerofoil section.

After the rod has been completely milled and the ends formed for engagement with a connecting means, a smooth finish may be given by use of suitable polishing and buffing wheels. In order to prevent corrosion of the metal in service, the rod may be finished by plating with cadmium or other corrosion resisting metal.

Having thus fully described the invention, what is claimed as new and desired to be secured by Letters Patent, is:

1. An aircraft tie rod formed of a body of metal of uniform cross-sectional area its entire length and having a cross-section of varying shape.

2. An aircraft tie rod formed of a body of metal of uniform cross-sectional area its entire length and having its ends cylindrical and its intermediate portion streamline in cross-section.

3. An aircraft tie rod formed of a body of metal of uniform cross-sectional area its entire length having its ends cylindrical and its intermediate portion streamline in cross-section interrupted at one point by a portion of circular cross-section.

4. An aircraft tie rod of uniform cross-sectional area having a portion of streamline shape.

5. An aircraft tie rod of uniform cross-sectional area having some portions of streamline contour and other portions of cylindrical contour.

6. An aircraft tie rod of uniform cross-sectional area having a portion of streamline shape and having its ends formed for engagement with connecting means.

7. An aircraft tie rod of uniform cross-sectional area having some portions of streamline contour and other portions of cylindrical contour and having its ends formed for engagement with connecting means.

8. An aircraft tie rod of streamline shape having some portions of cylindrical shape, in which the cross-sectional area of the aerofoil shape is equal to the cross-sectional area of the cylindrical shape.

9. An aircraft tie rod of uniform cross-sectional area having a portion aerofoil in cross-section, other portions circular in cross-section and still other portions a combination of part aerofoil and part circle in cross-section.

10. An aircraft tie rod of uniform cross-sectional area having a portion aerofoil in cross-section, other portions circular in cross-section and still other portions a combination of aerofoil and circle in cross-section and having its ends formed for engagement with a connecting means.

11. An aircraft tie rod having some portions of streamline shape and some portions of cylindrical shape, in which the cross-sectional area of the different shapes are equal, and having some portions where one shape merges into the other without any appreciable variation in cross-sectional area.

12. An aircraft tie rod having some portions of streamline shape and some portions of cylindrical shape, in which the cross-sectional area of the different shapes are equal, and having some portions where one shape merges into the other without any appreciable variation in cross-sectional area and in which the change from one shape to the other is gradual to avoid abrupt changes in contour.

13. An aircraft tie rod of streamline shape having some portions of cylindrical shape, in which the cross-sectional area of the streamline shape is equal to the cross-sectional area of the cylindrical shape.

LOUIS W. G. FLYNT.